United States Patent
Youtz et al.

(10) Patent No.: US 11,689,960 B2
(45) Date of Patent: Jun. 27, 2023

(54) SYSTEMS AND METHODS FOR OBTAINING AND INDICATING SUBSCRIPTION INFORMATION FOR A WIRELESS COMMUNICATION SERVICE

(71) Applicant: Verizon Patent and Licensing Inc., Basking Ridge, NJ (US)

(72) Inventors: Andrew E. Youtz, Princeton, NJ (US); Lily Zhu, Parsippany, NJ (US); Balaji L. Raghavachari, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

(21) Appl. No.: 17/088,247

(22) Filed: Nov. 3, 2020

(65) Prior Publication Data
US 2022/0141704 A1    May 5, 2022

(51) Int. Cl.
*H04W 28/02*    (2009.01)
*H04W 24/08*    (2009.01)

(52) U.S. Cl.
CPC ....... *H04W 28/0268* (2013.01); *H04W 24/08* (2013.01); *H04W 28/0257* (2013.01)

(58) Field of Classification Search
CPC ............. H04W 28/0268; H04W 24/08; H04W 28/0257
See application file for complete search history.

(56) References Cited

U.S. PATENT DOCUMENTS

| 2020/0112907 A1* | 4/2020 | Dao | H04M 15/84 |
| 2021/0153078 A1* | 5/2021 | Condoluci | H04W 28/24 |
| 2022/0086669 A1* | 3/2022 | Yao | H04L 41/40 |
| 2022/0086698 A1* | 3/2022 | Yao | H04W 24/08 |

* cited by examiner

*Primary Examiner* — Khaled M Kassim
*Assistant Examiner* — Najeeb Ansari (57) ABSTRACT

In some implementations, a network device may monitor a communication session associated with a user equipment and a network. The network device may determine a service-level identifier associated with a subscription of the user equipment, wherein the subscription is for a particular level of service that is to be provided by the network to the user equipment. The network device may determine that a performance metric associated with the communication session satisfies a performance threshold associated with the particular level of service. The network device may provide the service-level identifier to the user equipment based on the performance metric satisfying the performance threshold, wherein the service-level identifier enables an indication that the user equipment is receiving the particular level of service to be displayed by the user equipment.

20 Claims, 6 Drawing Sheets

SYSTEMS AND METHODS FOR OBTAINING AND INDICATING SUBSCRIPTION INFORMATION FOR A WIRELESS COMMUNICATION SERVICE

BACKGROUND

A 5$^{th}$ Generation/New Radio (5G/NR) wireless communication network provides various enhancements to wireless communications, such as flexible bandwidth allocation, improved spectral efficiency, ultra-reliable low-latency communications (URLLC), beamforming, and high-frequency communication (e.g., millimeter wave (mmWave)). User equipment (UEs) during the transition between 4G/Long Term Evolution (4G/LTE) and 5G/NR can support the simultaneous use of 4G/LTE and 5G/NR.

DETAILED DESCRIPTION OF PREFERRED EMBODIMENTS

The following detailed description of example implementations refers to the accompanying drawings. The same reference numbers in different drawings may identify the same or similar elements.

A user equipment (UE) may connect to a wireless communication network via a base station of a radio access network (RAN). The UE may determine an achievable peak data rate of the wireless communication network based on connecting to the wireless communication network. The UE may determine a type of the wireless communication network (e.g., a fifth generation (5G) network, a fourth generation (4G) network, a long-term evolution (LTE) network, a third generation (3G) network, a code division multiple access (CDMA) network, etc.) based on the achievable peak data rate. The UE may cause an icon to be displayed indicating the type of the wireless communication network to which the UE is connected.

However, a 5G/NR network may provide various levels of service to which a user of the UE may subscribe. A level of service may be associated with a particular icon that is to be displayed when the UE is connected to the 5G/NR network and when the user is subscribed to the level of service. Although the UE may be able to determine that a peak data rate associated with the level of service is achievable, the UE may be unable to determine whether the user is subscribed to the level of service.

Some implementations described herein enable a network device to obtain and provide subscription information for a wireless communication service to a UE. For example, a network device may monitor a communication session associated with a UE and a network. The network device may determine a service-level identifier associated with a subscription of UE. The subscription may be for a particular level of service that is to be provided by the network to the UE. The network device may determine that a performance metric associated with the communication session satisfies a performance threshold associated with the particular level of service. The network device may provide the service-level identifier to the UE based on the performance metric satisfying the performance threshold. The service-level identifier may enable an indication that the UE is receiving the particular level of service to be displayed by the UE.

Figure 1A:
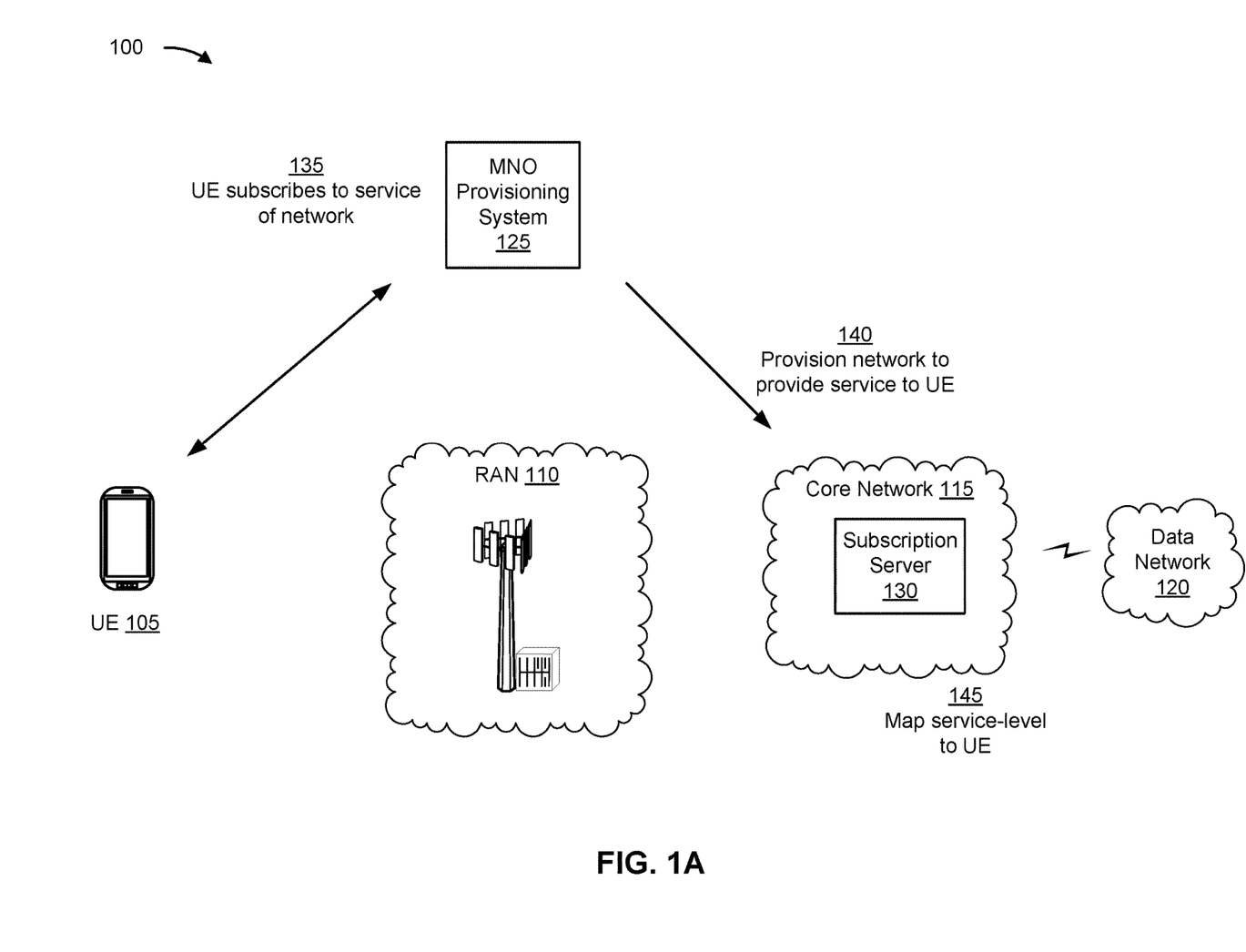
FIGS. 1A-1B are diagrams of one or more example implementations described herein.
Figure 1B:
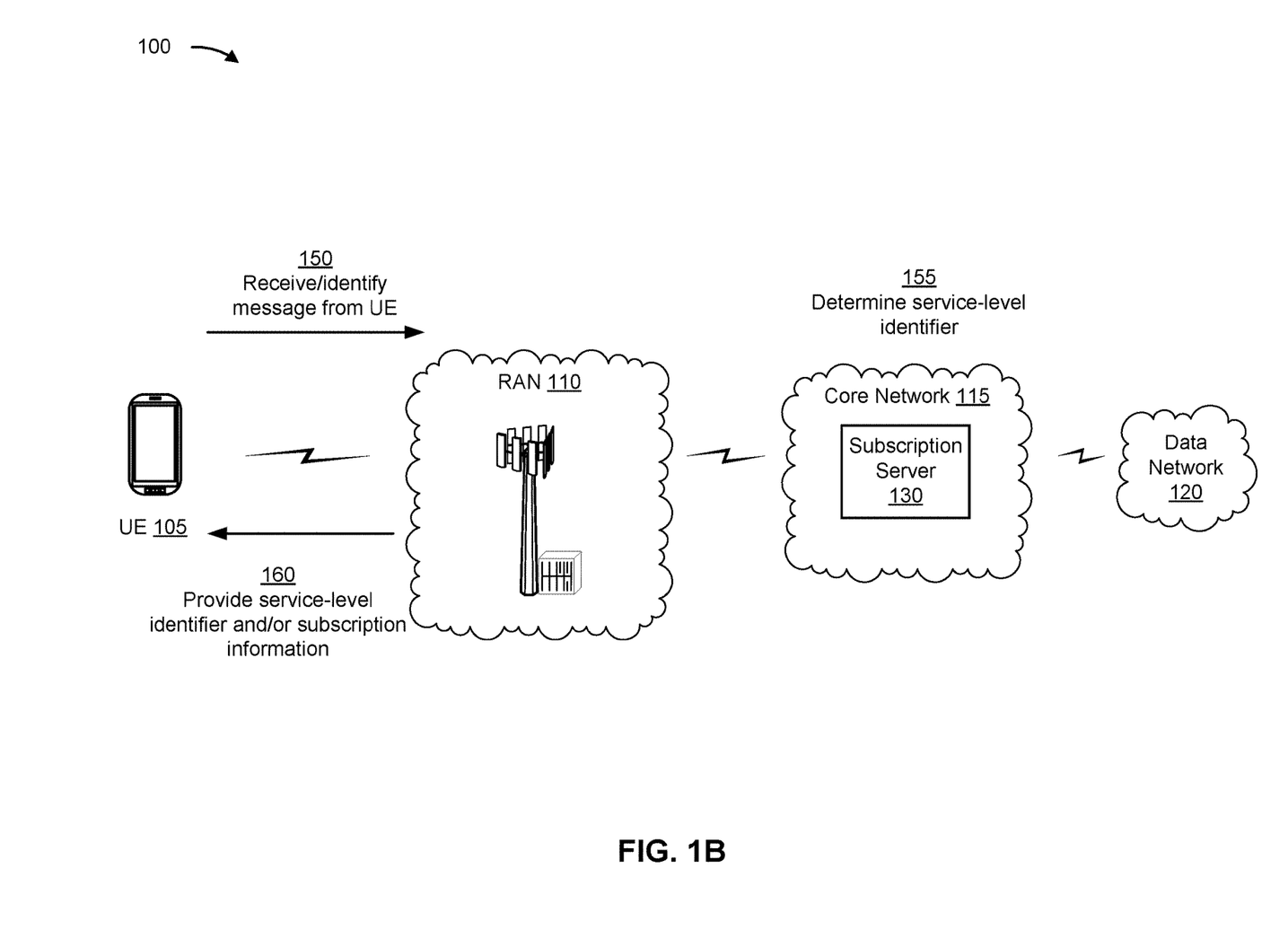

FIGS. 1A-1B are diagrams of one or more example implementations 100 described herein. As shown in FIGS. 1A-1B, the one or more example implementations 100 include a UE 105, a radio access network (RAN) 110, a core network 115, a data network 120, a mobile network operator (MNO) provisioning system 125, and a subscription server 130.

As shown in FIG. 1A, and by reference number 135, the UE 105 (e.g., the user associated with the UE 105) subscribes to a service of a wireless network. For example, the user may establish a service contract with an MNO, such as by logging in to a website and/or application associated with the MNO, adding the UE 105 to an account of the user, and/or inputting information identifying the service to which the user is subscribing.

The subscription may be for a particular level of service that is to be provided to the UE 105. In some implementations, the particular level of service may correspond to a premium service. The premium service may prioritize network resources to a subscriber of the premium service (e.g., the UE 105) over another UE that does not subscribe to the premium service, may enable the UE 105 to transmit data at a higher transmission rate relative to the other UE, and/or the like. Alternatively, and/or additionally, the particular level of service comprises a particular level of a 5G/NR wireless communication service.

In some implementations, the user may receive a universal integrated circuit card (UICC), often referred to as a subscriber identification module (SIM) or SIM card, that can be inserted into the UE 105 and used to access a wireless network (e.g., a Global System for Mobile communications (GSM) network, a Universal Mobile Telecommunications System (UMTS) network, a Long-Term Evolution (LTE) network, and/or a Fifth Generation (5G) network) based on the user subscribing to the service. The UICC may securely store information used to identify and authenticate the subscriber (e.g., the user and/or the UE 105) on the wireless network associated with the MNO. The SIM card may contain subscription credentials issued and authenticated by the MNO. The UE 105 may utilize the subscription credentials to connect to the wireless network associated with the MNO.

Alternatively, and/or additionally, the UE 105 includes an embedded UICC (eUICC) or embedded SIM (eSIM). The eUICC may be a UICC that can be remotely provisioned with one or more operator profiles. The eUICC may be associated with an eUICC identifier (eID) that is unique to the UE 105. The UE 105 may provide the eID to the MNO provisioning system 125 associated with the MNO based on the user subscribing to the service.

As shown by reference number 140, the MNO provisioning system 125 may provision the network to provide service to the UE 105. The MNO provisioning system 125 may provide information identifying the UE 105 (e.g., a SIM card identifier such as an integrated circuit card identifier (ICCID), the eID, and/or the like) and/or information identifying the user and/or the subscription (e.g., an International Mobile Subscriber Identity (IMSI), a Subscription Permanent Identifier (SUPI), and/or a Subscription Concealed Identifier (SUCI)) to a subscription server 130 included in a core network of the MNO. In some implementations, the subscription server 130 may be included in a provider gateway (PGW) device (shown in FIG. 3) of the core network 115. In some implementations, the subscription server 130 may be included in a session management function (SMF) device (shown in FIG. 3) of the core network 115. In some implementations, the subscription server 130 may be included in a unified data management (UDM) component of the core network. In some implementations, the network comprises a evolved packet core (EPC) network and the subscription server 130 is included in a home subscriber server (HSS).

The subscription server 130 may identify, using a data structure stored in memory of the subscription server 130, a SIM profile associated with the eID and the MNO. The subscription server 130 may activate the SIM profile to permit the UE 105 to be used to access and communicate via the network of the MNO. In some implementations, the SIM profile may be uniquely identified using an integrated circuit card identifier (ICCID), which may be stored by the subscription server 130 and may be associated with an account of the user upon activation of the SIM profile.

As shown by reference number 145, the subscription server 130 may map a service-level to the UE 105. The subscription server 130 may determine a service-level, of a plurality of service-levels, associated with the service subscribed to by the user. Each service-level, of the plurality of service levels, may be associated with a service-level identifier. The service-level identifier may include information that enables the UE 105 to determine that the UE 105 (e.g., the user associated with the UE 105) is subscribed to the service, as described in greater detail below.

In some implementations, a service-level identifier associated with a service includes a quality of service class identifier (QCI) associated with the particular level of service. The subscription server 130 may map a value of the QCI to the subscription associated with the UE 105. As an example, the network may provide a first level of service and a second level of service. The first level of service may be associated with a first range of QCI values and the second level of service may be associated with a second range of QCI values. The subscription server 130 may determine that the UE 105 is subscribed to the first level of service based on the information identifying the subscription and/or the user provided by the MNO provisioning system 125. The subscription server 130 may associate the UE 105 with a QCI having a value within the first range of values based on the UE 105 being subscribed to the first level of service.

In some implementations, the service-level identifier includes an operator reserved protocol configuration option (PCO). A value of the operator reserved PCO may indicate one of the various levels of service provided by the MNO. For example, the subscription server 130 may set the value of an operator reserved PCO associated with the UE 105 to a first value to indicate that the UE 105 is subscribed to the first level of service. Alternatively, and/or additionally, the service-level identifier may include an allocation and retention priority (ARP) value, an access point name (APN)-aggregate maximum bit rate (AMBR) value, and/or a packet data unit (PDU) session AMBR value.

The subscription server 130 may store information mapping the service-level identifier to an identifier associated with the UE 105 (e.g., the eID, the IMSI, the SUPI, and/or the SUCI) based on determining the service-level identifier.

In some implementations, the subscription server 130 may notify the MNO provisioning system 125 that the UE 105 is associated with a subscription of the MNO. For example, the subscription server 130 may provide a notification that includes the service-level identifier to the MNO provisioning system 125.

In some implementations, the MNO provisioning system 125 may transmit an instruction to enable the SIM profile on the UE 105 based on receiving the notification. The instruction may enable the UE 105 to access the wireless network of the MNO. For example, the instruction may include the subscription credentials that the UE 105 is to use to access the wireless network of the MNO.

As shown in FIG. 1B, and by reference number 150, the RAN 110 (e.g., a base station included in the RAN 110) may receive a message from the UE 105 and may identify the UE 105 based on the message. For example, the message received from the UE 105 may correspond to a request to establish a communication session. The message may include information identifying the UE 105 and information associated with establishing the communication session. The RAN 110 may identify the UE 105 as the sender of the message based on the information identifying the UE 105. The RAN 110 may provide information indicating that the UE 105 is connected to the network via the RAN 110 to the subscription server 130 based on identifying the UE 105 as the sender of the message.

As shown by reference number 155, the subscription server 130 determines the service-level identifier associated with the UE 105. The subscription server may determine the service-level identifier based on mapping the service-level identifier to the UE 105. The subscription server 130 may maintain a data structure storing information mapping a plurality of service-level identifiers for subscriptions of a plurality of UEs that are subscribed to the network. The subscription server 130 may identify a mapping that includes the service-level identifier and an identifier of the UE 105 based on the network being provisioned to provide the particular level of service to the UE 105. The subscription server 130 may determine the service-level identifier based on the mapping. The subscription server 130 may provide the service-level identifier to the RAN 110.

The RAN 110 may determine subscription information associated with the UE 105 based on the service-level identifier. In some implementations, the service-level identifier is a QCI and/or an ARP value associated with a particular service and/or a particular level of service. The RAN 110 may determine the subscription information based on accessing a data structure storing information mapping values of QCIs to services and/or levels of services. The RAN 110 may determine a value of the QCI. The RAN 110 may determine that the value of the QCI is within a range of QCI values associated with a particular service and/or a particular level of service based on the information stored in the data structure. The RAN 110 may determine that the service-level identifier indicates that the UE 105 is subscribed to the particular service and/or is to be provided the particular level of service based on the value of the QCI being within the range of QCI values associated with the particular service and/or the particular level of service. The RAN 110 may obtain subscription information associated with the particular service and/or the particular level of service (e.g., from a data structure stored in a memory of the RAN 110) based on the UE 105 being subscribed to the particular service and/or that the UE 105 is to be provided the particular level of service.

The RAN 110 may determine subscription information associated with the particular level of service and/or the range of QCI values. For example, the RAN 110 may access a data structure storing information mapping levels of service and/or ranges of QCI values to subscription information. The subscription information may include information identifying a performance metric associated with the level of service and/or a performance threshold. For example, the subscription information may include information identifying an aggregate maximum bitrate (AMBR) associated with the RAN 110 and/or a performance threshold associated with the AMBR.

As shown by reference number 160, the RAN 110 provides the service-level identifier and/or the subscription information to the UE 105. In some implementations, the RAN 110 provides the service-level identifier and/or the subscription information to the UE 105 based on the performance metric satisfying the performance threshold. For example, the RAN 110 may determine an AMBR associated with the RAN 110 and may determine that the AMBR satisfies the performance threshold. The RAN 110 may provide the service-level identifier and/or the subscription information to the UE 105 based on the AMBR satisfying the performance threshold. In some implementations, the UE 105 may determine the service-level identifier based on the QCI and/or the AMBR value provided by the network being within a designated, pre-defined range of QCI and/or AMBR values.

In some implementations, the RAN 110 provides the service-level identifier and/or the subscription information to the UE 105 in a downlink message of the communication session. The service-level identifier may be provided to the UE 105 according to a provider-specific protocol configuration option (e.g., PCO) that is specific to a service provider (e.g., the MNO associated with the MNO provisioning system 125) associated with the wireless network.

The downlink message may correspond to a response to the message received from the UE 105. For example, the message received from the UE 105 may correspond to a request to establish the communication session and the downlink message may be a response message configured to establish the communication with the UE 105. Alternatively, and/or additionally, the RAN 110 may embed the service-level identifier and/or the subscription information within a message transmitted to the UE 105 via the communication session. The RAN 110 may provide the service-level identifier and/or the subscription information to the UE 105 to enable the UE 105 to display an indication (e.g., an icon, a symbol, and/or the like) that the UE 105 is receiving the particular level of service, as described below with respect to FIG. 2.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
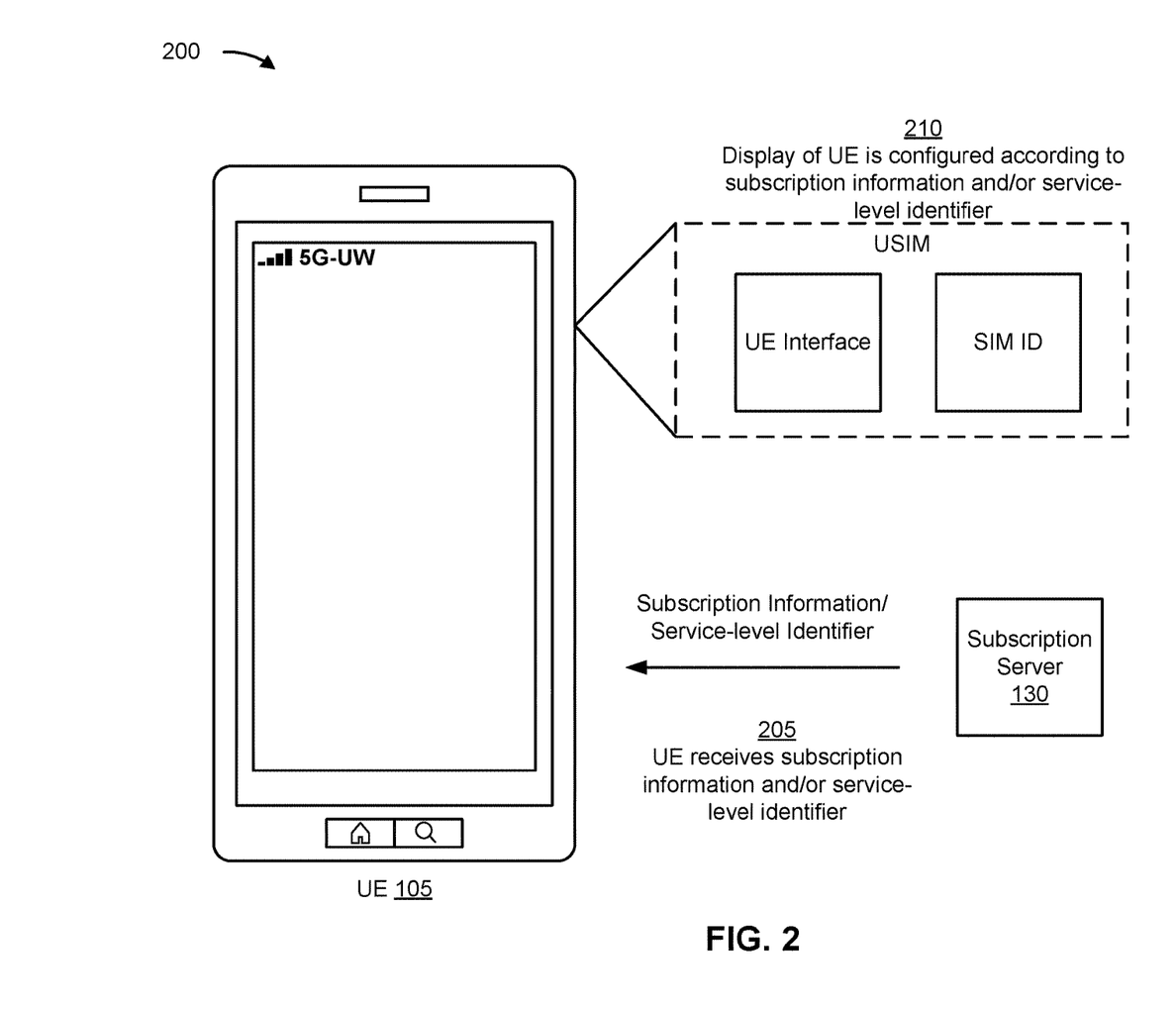
FIG. 2 is a diagram of an example implementation described herein.

FIG. 2 is a diagram of an example implementation 200 described herein. As shown in FIG. 2, example 200 includes a UE 105 configured to display an indication (e.g., an icon, a symbol, and/or the like) that the UE 105 is receiving a particular level of service based on a service-level identifier and/or subscription information, as described below.

As shown by reference number 205, the UE 105 receives subscription information and/or a service-level identifier. The UE 105 may subscribe to a service of a wireless network and an MNO provisioning system may provision the wireless network to provide service to the UE 105, in a manner similar to that described above with respect to FIG. 1A. Further, a subscription server 130 may determine a service-level identifier and/or subscription information associated with the UE 105 based on the MNO provisioning system provisioning the wireless network to provide service to the UE 105, in a manner similar to that described above with respect to FIG. 1A. The UE 105 may receive the subscription information and/or the service-level identifier from the subscription server 130 (e.g., via the RAN 110) based on the subscription server 130 determining the service-level identifier and/or the subscription information.

In some implementations, the UE 105 determines the subscription information based on the service-level identifier. For example, the service-level identifier may include a QCI and/or an operator reserved PCO and the UE 105 may determine the subscription information based on the service level identifier in a manner similar to that described above with respect to FIG. 1B.

In some implementations, the UE 105 determines that the UE 105 is subscribed to a particular service based on the service-level identifier. In some implementations, the service-level identifier includes an operator reserved PCO. The UE 105 may determine a value of the operator reserved PCO. The UE 105 may determine that the UE 105 is subscribed to a particular service based on the value of the operator reserved PCO. For example, the UE 105 may determine whether the value of the operator reserved PCO is a first value or a second value. The UE 105 may determine that the UE 105 is subscribed to a particular service when the value of the operator reserved PCO is the first value.

In some implementations, the service-level identifier includes a QCI. The UE 105 may determine a value of the QCI. The UE 105 may determine whether the value of the QCI is within a range of values associated with a particular service. The UE 105 may determine that the UE 105 is subscribed to the particular service when the value of the QCI is within the range of values associated with the particular service.

The UE 105 may determine a performance metric associated with the particular service. In some implementations, the UE 105 determines the performance metric based on the subscriber information. For example, the subscriber information may include information identifying the performance metric associated with the particular service.

The UE 105 may determine a network condition associated with the performance metric. For example, the UE 105 may determine an AMBR associated with the wireless network, a signal-to-noise ratio associated with the wireless network, and/or another network condition. The UE 105 may determine a value of the performance metric based on the network condition. The UE 105 may determine that the value of the performance metric satisfies a performance threshold.

As shown by reference number 210, a display of the UE 105 is configured according to the subscription information and/or the service-level identifier. The UE 105 may determine an indicator associated with the particular service based on the performance metric satisfying the performance threshold and based on the UE 105 being subscribed to the particular service. The UE 105 may cause the indicator to be displayed based on the indicator being associated with the particular service. For example, as shown in FIG. 2, the UE 105 causes the indicator "5G-UW" to be displayed based on based on the UE 105 being subscribed to the particular service and based on the performance metric satisfying the performance threshold. Causing the indicator to be display may enable the user associated with the UE 105 to quickly and easily determine that the user is being provided the level of service to which the user is subscribed.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
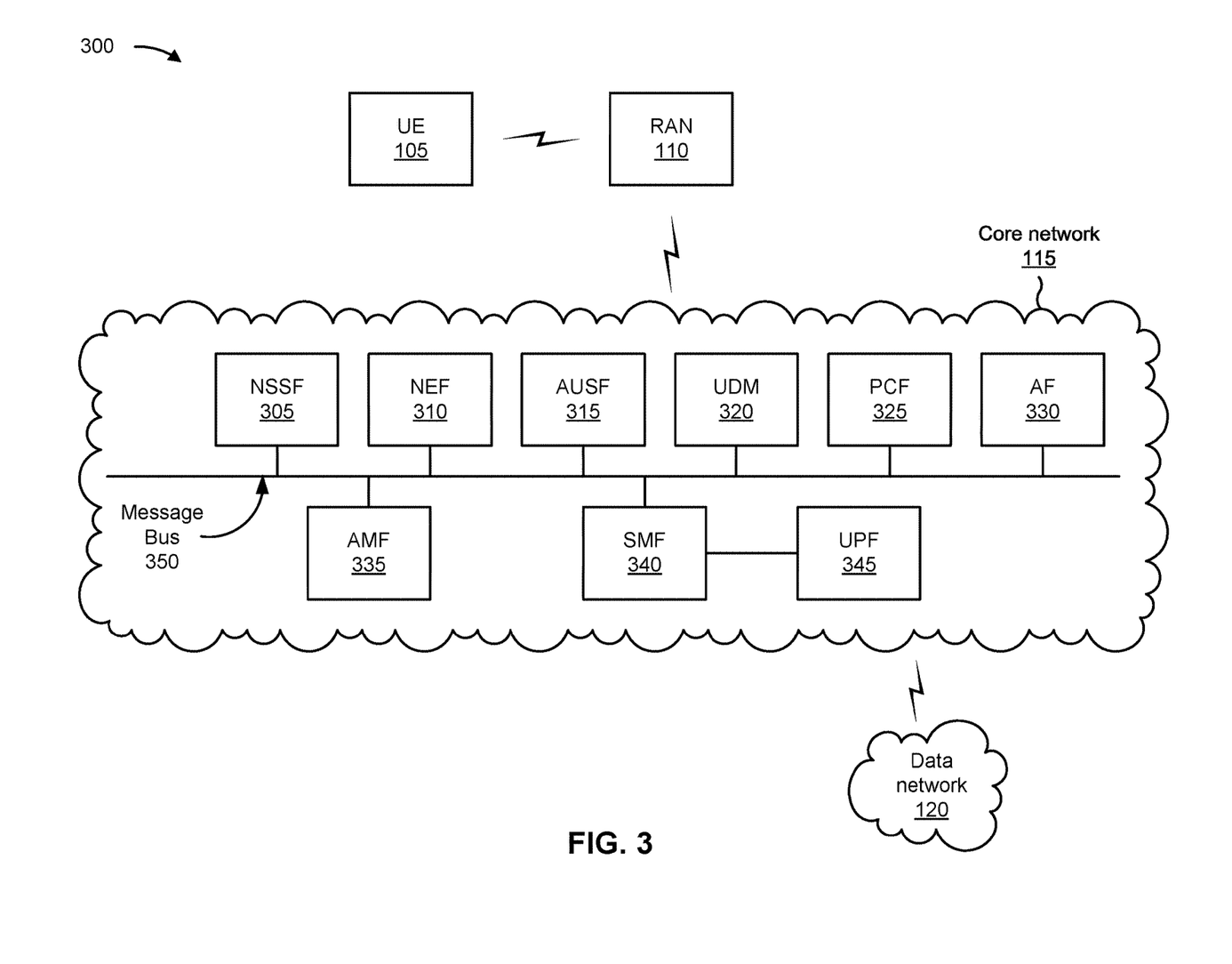
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a UE 105, a RAN 110, a core network 115, and a data network 120. Devices and/or networks of example environment 300 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105. RAN 110 may transfer traffic between UE 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for UE 105 covered by RAN 110 (e.g., UE 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of UE 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture, a 4G core network, and/or the like.

As shown in FIG. 3, core network 115 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, a user plane function (UPF) 345, and/or the like. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 305 includes one or more devices that select network slice instances for UE 105. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating UE 105 in the wireless telecommunications system.

UDM 320 includes one or more devices that store user data and profiles in the wireless telecommunications system. UDM 320 may be used for fixed access, mobile access, and/or the like, in core network 115.

PCF 325 includes one or more devices that provide a policy framework that incorporates network slicing, roaming, packet processing, mobility management, and/or the like.

AF 330 includes one or more devices that support application influence on traffic routing, access to NEF 310, policy control, and/or the like.

AMF 335 includes one or more devices that act as a termination point for non-access stratum (NAS) signaling, mobility management, and/or the like.

SMF 340 includes one or more devices that support the establishment, modification, and release of communication sessions in the wireless telecommunications system. For example, SMF 340 may configure traffic steering policies at UPF 345, enforce user equipment IP address allocation and policies, and/or the like.

UPF 345 includes one or more devices that serve as an anchor point for intraRAT and/or interRAT mobility. UPF 345 may apply rules to packets, such as rules pertaining to packet routing, traffic reporting, handling user plane QoS, and/or the like.

Message bus 350 represents a communication structure for communication among the functional elements. In other words, message bus 350 may permit communication between two or more functional elements.

Data network 355 includes one or more wired and/or wireless data networks. For example, data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
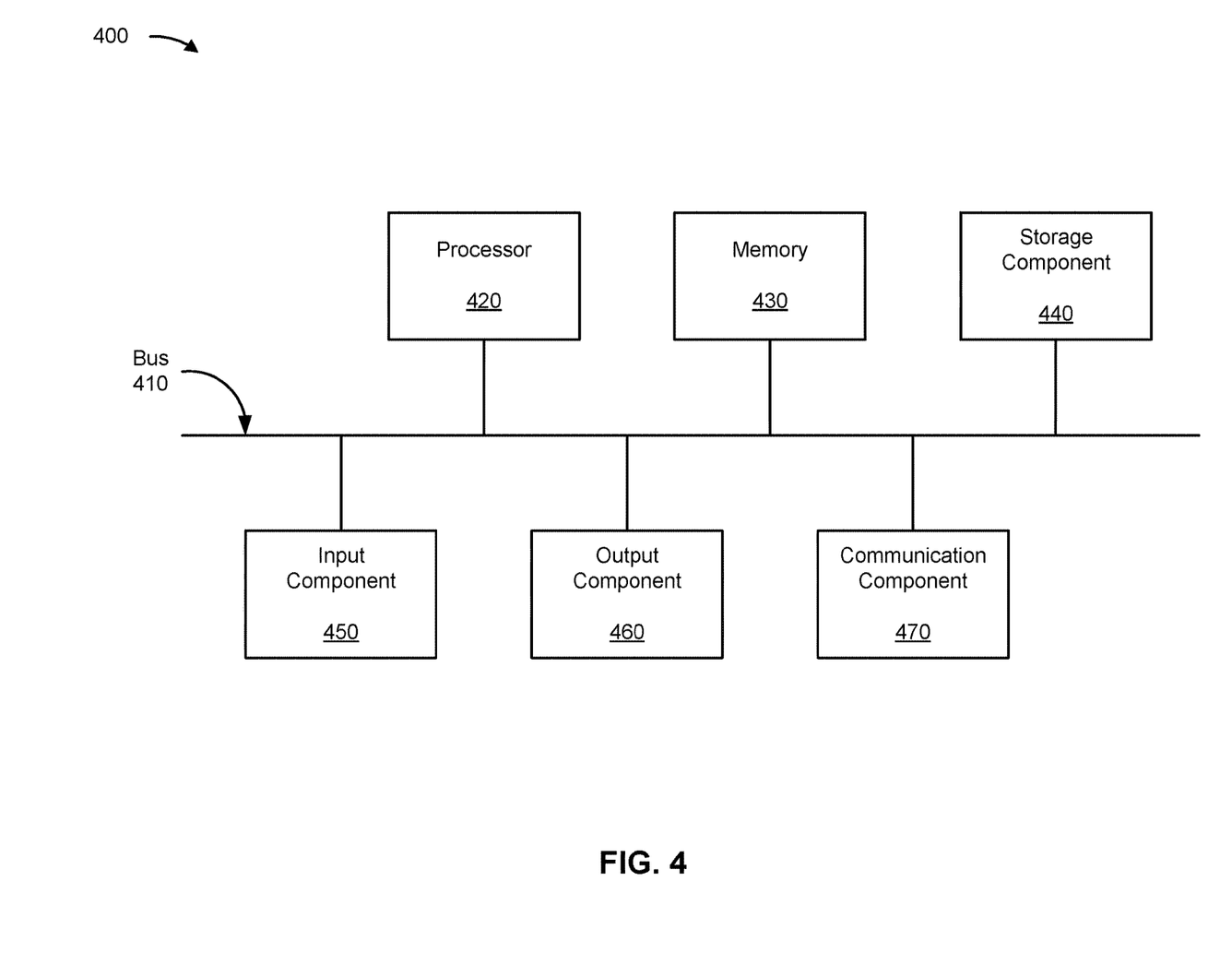
FIG. 4 is a diagram of example components of one or more devices of FIG. 3.

FIG. 4 is a diagram of example components of a device 400, which may correspond to UE 105, NSSF 305, NEF 310, AUSF 315, UDM 320, PCF 325, AF 330, AMF 335, SMF 340, and/or UPF 345. In some implementations, UE 105, NSSF 305, NEF 310, AUSF 315, UDM 320, PCF 325, AF 330, AMF 335, SMF 340, and/or UPF 345 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
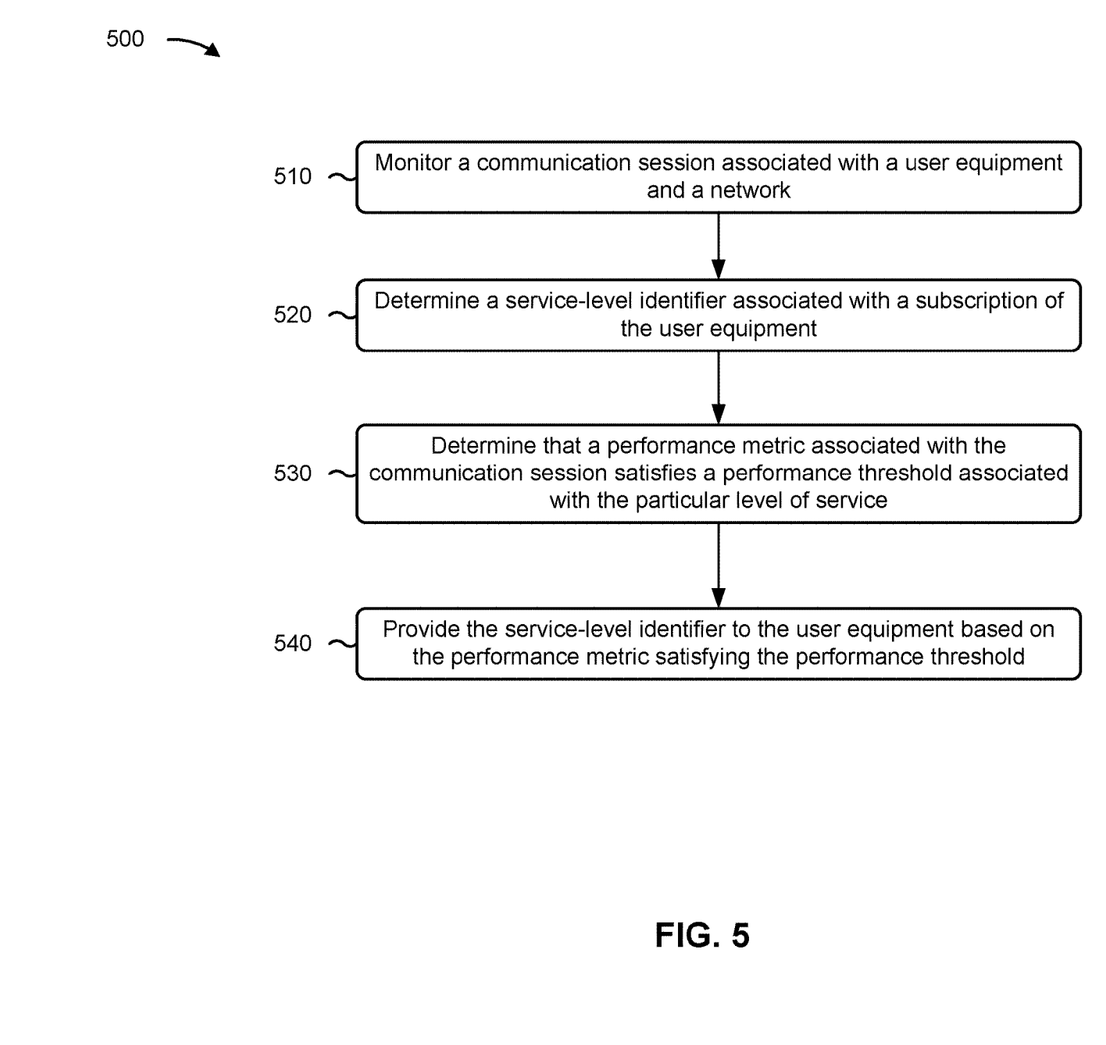
FIG. 5 is a flowchart of an example process relating to obtaining and indicating subscription information for a wireless communication service.

FIG. 5 is a flowchart of an example process 500 associated with systems and methods for obtaining and indicating subscription information for a wireless communication service. In some implementations, one or more process blocks of FIG. 5 may be performed by a network device (e.g., a base station included in RAN 110 and/or subscription server 130). In some implementations, one or more process blocks of FIG. 5 may be performed by another device or a group of devices separate from or including the network device, such as a UE (e.g., UE 105), a NSSF (e.g., NSSF 305), a NEF (e.g., NEF 310), an AUSF (e.g., AUSF 315), a UDM (e.g., UDM 320), a PCF, (e.g., PCF 325), an AF (e.g., AF 330), an AMF (e.g., AMF 335), a SMF (e.g., SMF 340), and/or a UPF (e.g., UPF 345). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include monitoring a communication session associated with a user equipment and a network (block 510). For example, the network device may monitor a communication session associated with a user equipment and a network, as described above.

As further shown in FIG. 5, process 500 may include determining a service-level identifier associated with a subscription of the UE (block 520). For example, the network device may determine a service-level identifier associated with a subscription of the UE, as described above. In some implementations, the subscription is for a particular level of service that is to be provided by the network to the UE. The service-level identifier may comprise a QCI associated with the particular level of service and a value of the QCI may be mapped to the subscription. The particular level of service may correspond to a premium service that is provided by the network. Alternatively, and/or additionally, the particular level of service may comprise a particular level of a 5G/NR wireless communication service of the network.

In some implementations, the service-level identifier is obtained from a data structure of the subscription server that includes mappings of a plurality of service-level identifiers for subscriptions of a plurality of UEs that are subscribed to the network. One of the mappings may include the service-level identifier and an identifier of the UE based on the network being provisioned to provide the particular level of service to the UE.

Determining the service-level identifier may comprise obtaining, from a subscription server of the network, a QCI associated with the particular level of service and determining, based on the QCI, subscription information associated with the subscription. The service-level identifier may be determined from the subscription information.

In some implementations, the network device may determine a performance metric associated with the communication session and may select the subscription information, from a set of subscription information associated with a plurality of levels of the service, based on the performance metric and a performance threshold of the particular level of service. The plurality of levels of service may correspond to various levels of a 5G/NR wireless communication service.

As further shown in FIG. 5, process 500 may include determining that a performance metric associated with the communication session satisfies a performance threshold associated with the particular level of service (block 530). For example, the network device may determine that a performance metric associated with the communication session satisfies a performance threshold associated with the particular level of service, as described above. The performance metric may comprise an AMR associated with a base station that is serving the UE in association with the communication session.

As further shown in FIG. 5, process 500 may include providing the service-level identifier to the UE based on the performance metric satisfying the performance threshold (block 540). For example, the network device may provide the service-level identifier to the UE based on the performance metric satisfying the performance threshold, as described above. In some implementations, the service-level identifier enables an indication that the UE is receiving the particular level of service to be displayed by the UE.

The service-level identifier may be provided to the UE in a downlink message of the communication session. For example, the message may correspond to a request to establish the communication session and the downlink message may comprise a response that is configured to establish the communication session. In some implementations, the service-level identifier is provided to the UE according to a provider-specific configuration option that is specific to a service provided associated with the network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
monitoring, by a network device, a communication session associated with a user equipment and a network;
determining, by the network device, a service-level identifier, from at least a first service-level identifier and a second service-level identifier, associated with a subscription of the user equipment,
wherein the subscription is for a particular level of service, of a plurality of levels of service, that is to be provided by the network to the user equipment, and
wherein the plurality of levels of service includes:
a first level of service associated with a first range of quality of service (QoS) class identifier (QCI) values, and
a second level of service associated with a second range of QCI values,
wherein the first level of service is associated with the first service-level identifier and the second level of service is associated with the second service-level identifier;
determining, by the network device, that a performance metric associated with the communication session satisfies a performance threshold associated with the particular level of service; and
providing, by the network device, the service-level identifier to the user equipment based on the performance metric satisfying the performance threshold,
wherein the service-level identifier enables an indication that the user equipment is receiving the particular level of service to be displayed by the user equipment.

2. The method of claim 1, wherein the particular level of service corresponds to a premium service that is provided by the network.

3. The method of claim 1, wherein the service-level identifier is provided to the user equipment in a downlink message of the communication session.

4. The method of claim 1, wherein the service-level identifier is provided to the user equipment according to a provider-specific protocol configuration option that is specific to a service provider associated with the network.

5. The method of claim 1, wherein determining the service-level identifier comprises:
obtaining, from a subscription server of the network, a QCI associated with the particular level of service; and
determining, based on the QCI, subscription information associated with the subscription,
wherein the service-level identifier is determined from the subscription information.

6. The method of claim 1, wherein the performance metric comprises an aggregate maximum bitrate (AMBR) associated with a base station that is serving the user equipment in association with the communication session.

7. The method of claim 1, wherein the particular level of service comprises a particular level of a 5G new radio (5G/NR) wireless communication service of the network.

8. A network device, comprising:
one or more processors configured to:
receive a message associated with a communication session involving a user equipment and a network;
obtain, from a subscription server of the network, a service-level identifier, from at least a first service-level identifier and a second service-level identifier, associated with a subscription, of the user equipment, for a particular level of service of a plurality of levels of service,
wherein the plurality of levels of service includes:
a first level of service associated with a first range of quality of service (QoS) class identifier (QCI) values, and
a second level of service associated with a second range of QCI values,
wherein the first level of service is associated with the first service-level identifier and the second level of service is associated with the second service-level identifier;
determine, based on the service-level identifier, subscription information associated with the subscription,
wherein the one or more processors, when determining the subscription information, are configured to:
determine a performance metric associated with the communication session; and
select the subscription information based on the performance metric and a performance threshold of the particular level of service; and
provide, to the user equipment, the subscription information in a response to the message and the service-level identifier based on the performance metric satisfying the performance threshold,
wherein the service-level identifier enables an indication that the user equipment is receiving the particular level of service to be displayed by the user equipment.

9. The network device of claim 8, wherein the message corresponds to a request to establish the communication session and the response is configured to establish the communication session.

10. The network device of claim 8, wherein the response corresponds to a downlink message of the communication session.

11. The network device of claim 8, wherein the service-level identifier comprises a QCI associated with the particular level of service,
wherein a value of the QCI is mapped to the subscription.

12. The network device of claim 8, wherein the service-level identifier is obtained from a data structure of the subscription server that includes mappings of a plurality of service-level identifiers for subscriptions of a plurality of user equipment that are subscribed to the network,
wherein one of the mappings includes the service-level identifier and an identifier of the user equipment based on the network being provisioned to provide the particular level of service to the user equipment.

13. The network device of claim 8,
wherein the subscription information is selected from a set of subscription information associated with the plurality of levels of the service.

14. The network device of claim 8, wherein the plurality of levels of the service correspond to various levels of a 5G new radio (5G/NR) wireless communication service.

15. A non-transitory computer-readable medium storing a set of instructions, the set of instructions comprising:
one or more instructions that, when executed by one or more processors of a network device, cause the network device to:
receive a message associated with a communication session involving a user equipment and a network;

obtain, from a subscription server of the network, a service-level identifier, from at least a first service-level identifier and a second service-level identifier, associated with a subscription for a particular level of service, of a plurality of levels of service, that is to be provided by the network to the user equipment, wherein the plurality of levels of service includes:
    a first level of service associated with a first range of quality of service (QoS) class identifier (QCI) values, and
    a second level of service associated with a second range of QCI values,
        wherein the first level of service is associated with the first service-level identifier and the second level of service is associated with the second service-level identifier;
determine that a performance metric associated with the communication session satisfies a performance threshold associated with the particular level of service; and
provide, to the user equipment, the service-level identifier in a response to the message based on determining that the performance metric satisfies the performance threshold,
    wherein the service-level identifier enables an indication that the user equipment is receiving the particular level of service to be displayed by the user equipment.

16. The non-transitory computer-readable medium of claim 15, wherein the message corresponds to a request to establish the communication session and the response is configured to cause the communication session to be established, and
    wherein the response corresponds to a downlink message of the communication session.

17. The non-transitory computer-readable medium of claim 15, wherein the service-level identifier comprises provider-specific protocol configuration option information that is specific to a service provider associated with the network.

18. The non-transitory computer-readable medium of claim 15, wherein the service-level identifier comprises a QCI associated with the particular level of service.

19. The non-transitory computer-readable medium of claim 15, wherein the one or more instructions that cause the one or more processors to determine that the performance metric associated with the communication session satisfies the performance threshold, the network device to:
    determine the performance metric associated with a wireless connection between the user equipment and a base station of the network.

20. The non-transitory computer-readable medium of claim 19, wherein the performance metric comprises an aggregate maximum bitrate (AMBR) associated with the base station.

* * * * *